United States Patent [19]

Nakajima et al.

[11] Patent Number: 4,725,936
[45] Date of Patent: Feb. 16, 1988

[54] HIGH-VOLTAGE STABILIZING POWER SUPPLY APPARATUS WITH AN IMPROVED INDUCTIVE NOISE COMPENSATION

[75] Inventors: Akira Nakajima; Masayasu Doi, both of Yokohama; Kenji Iida, Tokyo, all of Japan

[73] Assignee: Kabushiki Kaisha Toshiba, Kawasaki, Japan

[21] Appl. No.: 26,204

[22] Filed: Mar. 16, 1987

[30] Foreign Application Priority Data

Mar. 17, 1986 [JP] Japan .................................. 61-38895

[51] Int. Cl.$^4$ ............................................. H02M 3/335
[52] U.S. Cl. ............................................. 363/21; 363/16
[58] Field of Search ........................ 363/13, 15, 16, 20, 363/21

[56] References Cited

U.S. PATENT DOCUMENTS

| | | | |
|---|---|---|---|
| 4,507,721 | 3/1985 | Yamano et al. | 363/21 |
| 4,527,229 | 7/1985 | Imamura et al. | 363/126 |
| 4,561,046 | 12/1985 | Kuster | 363/21 |
| 4,674,020 | 6/1987 | Hill | 363/21 |
| 4,688,160 | 8/1987 | Fraidlin | 363/21 |

Primary Examiner—Patrick R. Salce
Assistant Examiner—Marc S. Hoff
Attorney, Agent, or Firm—Oblon, Fisher, Spivak, McClelland & Maier

[57] ABSTRACT

A DC-DC converter converts a DC input to a predetermined high-voltage DC output according to a predetermined control signal. An output unit has a pair of high- and low-voltage-side output paths and supplies the predetermined high-voltage DC output to a load. An output variation detecting unit has a resistor voltage dividing circuit including high- and low-voltage-side resistors connected in series between the pair of output paths and detects a variation in predetermined high-voltage DC output that follows a variation in the load. An inner shield shields the exterior of the resistor voltage dividing circuit. The inner shield is electrically connected to a node of the high- and-low voltage-side resistors. An outer shield shields the exterior of the inner shield. The outer shield is electrically connected to the low voltage-side output path of the pair of output paths. A control unit receives a voltage component generated across both ends of the low-voltage-side resistor of the resistor voltage dividing circuit, generates the predetermined control signal in accordance with the voltage component, and supplies the predetermined control signal to the DC-DC converter.

9 Claims, 12 Drawing Figures

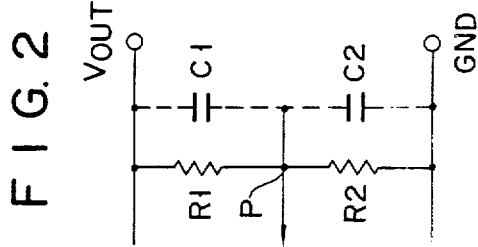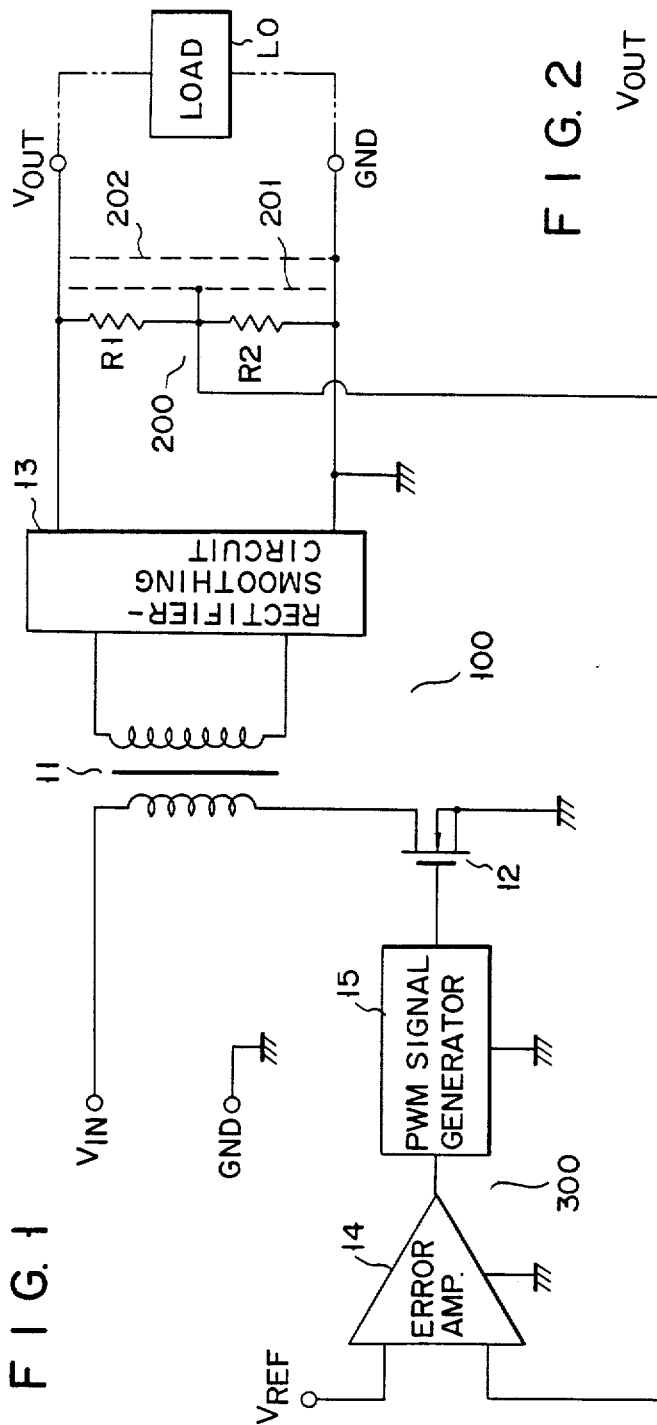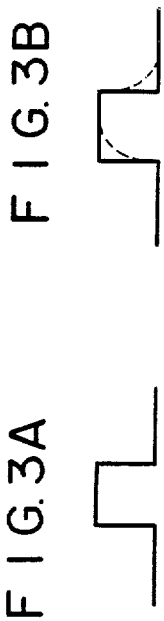

HIGH-VOLTAGE STABILIZING POWER SUPPLY APPARATUS WITH AN IMPROVED INDUCTIVE NOISE COMPENSATION

BACKGROUND OF THE INVENTION

This invention relates to a high-voltage stabilizing power supply apparatus with an improved inductive noise compensation and, more particularly, to a high-voltage stabilizing power supply apparatus suitable for supplying an anode voltage of a cathode ray tube (CRT).

Generally, an anode of a CRT used in a display, such as a television receiver, receives a high voltage DC output from a kind of DC-DC converter wherein horizontal flyback pulses are boosted by a flyback transformer and are rectified and smoothed by a rectifier-smoothing circuit. A stabilizing power supply is used, in this case, that has a technique to improve the high-voltage stability of the CRT against a change in anode current (generally a load current).

In a conventional apparatus as such a high-voltage stabilizing power supply, a high-resistance resistor voltage divider is provided between a pair of output terminals in order to detect a variation in output voltage corresponding to the variation in load current. A pulse width modulation (PWM) control signal generator generates a PWM control signal having a pulse width in accordance with the amplitude of an error voltage corresponding to the variation in output voltage detected by a low-voltage-side resistor of the resistor voltage divider. A switching element switches a DC voltage input supplied to the primary winding of a step-up transformer based on the PWM control signal. The rectifier-smoothing circuit rectifies and smoothes the output from the secondary winding of the step-up transformer and supplies a stabilizing high-voltage DC output to the pair of output terminals.

In the high-voltage stabilizing power supply as described above, external inductive noise or a switching frequency (converter frequency) component of about, e.g., 10 to 100 kHz, induced in the resistor voltage divider causes a problem. If such inductive noise exists, variation detection of the high-voltage output by the resistor voltage divider is interfered with, and high-voltage stability cannot be obtained.

In order to solve the above problem, a single shield for induction prevention is provided to the resistor voltage divider, or a capacitor for compensating the inductive noise is connected in parallel with the low-voltage side of the resistor voltage divider.

However, when such countermeasures are taken, the frequency response characteristics are degraded by the influence of the stray capacitance at the node between the resistor voltage divider and the shield. This is because, for example, a rectangular wave high-voltage output variation has an unpreferable transient (a so-called undercut characteristic) wherein the leading and trailing edges of a waveform detected by the low-voltage-side resistor of the resistor voltage divider are rounded. This means that the high-voltage stabilizing power supply has poor response characteristics against a dynamic variation in load current.

In order to compensate for the degradation in the response characteristics, it is proposed to connect another capacitor in parallel with the high-voltage-side resistor of the terminal voltage divider. However, with this countermeasure, since the capacitor to be connected to the high-voltage-side resistor must have a considerably high withstand voltage property, the size and cost of the overall apparatus are increased and reliability suffers.

SUMMARY OF THE INVENTION

It is, therefore, an object of the present invention to provide a new and improved high-voltage stabilizing power supply apparatus with an improved inductive noise compensation, which can compensate for the inductive noise without using a high withstand voltage capacitor or degrading the frequency response characteristics, can improve the high-voltage stability against the load variation, and can contribute to size and cost reduction and reliability improvement.

According to the present invention, there is provided a high-voltage stabilizing power supply apparatus comprising:

input means for receiving a DC input;

DC-DC converter means coupled to the input means for converting the DC input to a predetermined high-voltage DC output according to a predetermined control signal;

output means coupled to the DC-DC converter means, having a pair of high- and low-voltage-side output paths, and for supplying the predetermined high voltage DC output to a load;

output variation detecting means, having a resistor voltage dividing circuit including high- and low-voltage-side resistors connected in series between the pair of output paths, for detecting a variation in predetermined DC high-voltage DC output that follows a variation in the load;

inner shield means, for shielding an exterior of the resistor voltage dividing circuit, said inner shield means being electrically connected to a node of the high- and low-voltage-side resistors;

outer shield means, for shielding an exterior of the inner shield means, said outer shield means being electrically connected to the low-voltage-side output path of the pair of output paths; and control means for receiving a voltage component generated across both ends of the low-voltage-side resistor of the resistor voltage dividing circuit, generating the predetermined control signal in accordance with the voltage component, and supplying the predetermined control signal to the DC-DC converter means.

BRIEF DESCRIPTION OF THE DRAWINGS

These and other objects and features of the present invention can be understood through the following embodiments by reference to the accompanying drawings, in which:

FIG. 1 is a circuit diagram of a high-voltage stabilizing power supply apparatus according to an embodiment of the present invention;

FIG. 2 is an equivalent circuit diagram for explaining the operation of the embodiment shown in FIG. 1;

FIGS. 3A and 3B are waveform charts for explaining the operation of the same;

DETAILED DESCRIPTION OF THE PREFERRED EMBODIMENTS

Figure 4:
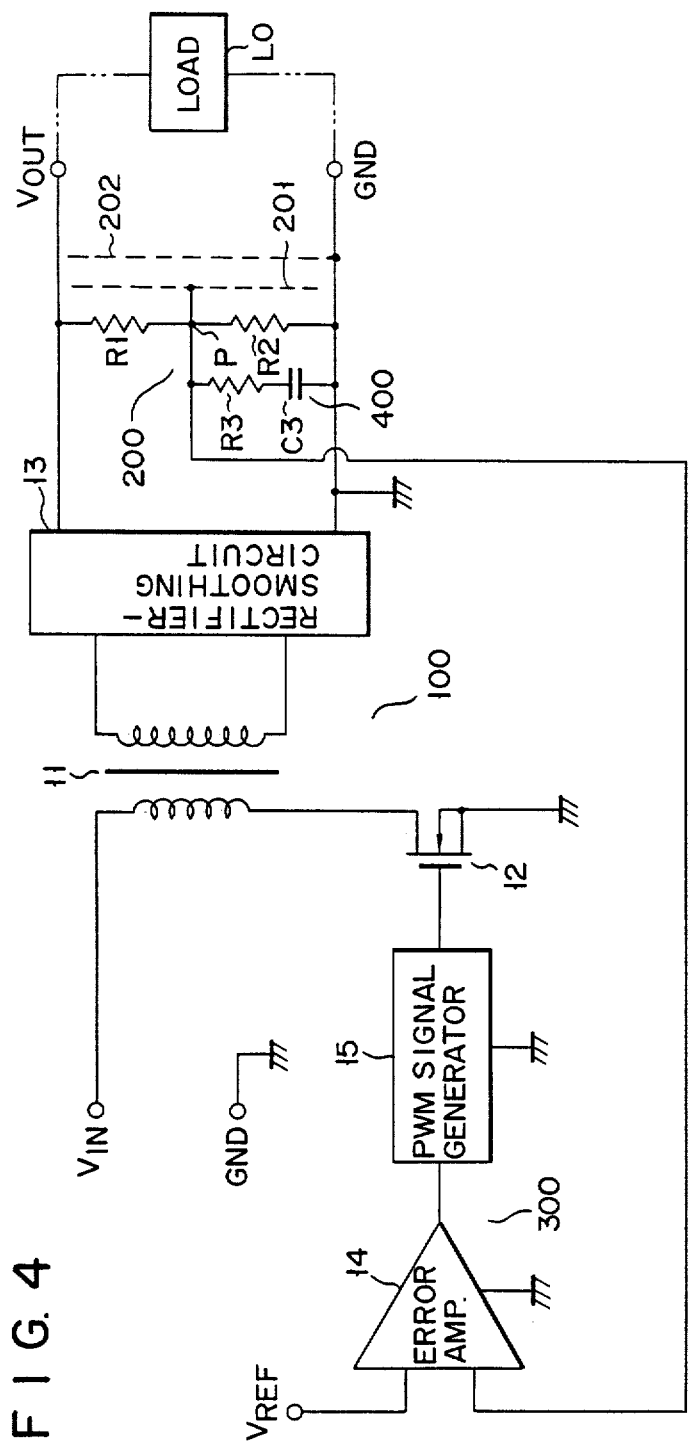
FIG. 4 is a circuit diagram of another embodiment of the present invention.

FIG. 1 shows a high-voltage stabilizing power supply apparatus according to an embodiment of the present invention. Referring to FIG. 1, reference symbol VIN denotes, e.g., an input terminal. DC input of a predetermined voltage is supplied across input terminal $V_{IN}$ and reference voltage terminal (ground terminal) GND. Terminal $V_{IN}$ is connected to one end of the primary winding of step-up transformer 11. The other end of the primary winding of transformer 11 is connected to the drain of field effect transistor (FET) 12 as a switching element. Both ends of the secondary winding of transformer 11 are connected to a pair of input terminals of rectifier-smoothing circuit 13. First and second high-resistance resistors R1 and R2 are connected in series between a pair of output terminals of rectifier-smoothing circuit 13. The pair of output terminals of rectifier-smoothing circuit 13 are connected to high-voltage (hot)-side output terminal $V_{OUT}$ and low-voltage (cold)-side output terminal GND serving as a reference potential terminal (ground terminal), which constitute a pair of output terminals of the high-voltage stabilizing power supply apparatus.

Step-up transformer 11, FET (switching element) 12, and rectifier-smoothing circuit 13 constitute a kind of DC-DC converter 100 for converting the DC input voltage into a high voltage DC output of about, e.g., 6 to 20 kV for use in a CRT, for example. First and second resistors R1 and R2 constitute resistor voltage divider 200 for detecting a variation in high-voltage output corresponding to the variation in current flowing in load (e.g., anode of the CRT) LO connected between a pair of output terminals $V_{OUT}$ and GND of the high-voltage stabilizing power supply apparatus. It must be noted that the resistances of first and second resistors R1 and R2 connected to hot ($V_{OUT}$) and cold (GND) sides, respectively, are set to be, e.g., R1 = 300 MΩ and R2 = 30 kΩ, thus R1 >> R2.

The outer surface of resistor voltage divider 200 is electromagnetically and electrostatically shielded in a double manner by inner and outer shields 201 and 202. Inner shield 201 is electrically connected to the node of first and second resistors R1 and R2. Outer shield 202 is electrically connected to the cold-side output terminal.

The node of first and second resistors R1 and R2 is connected to one input terminal of error amplifier 14. The other input terminal of amplifier 14 receives reference voltage $V_{REF}$. The output terminal of amplifier 14 is connected to the input terminal of pulse width modulation (PWM) control signal generator 15. The output terminal of generator 15 is connected to the gate of FET 12.

Error amplifier 14 and PWM control signal generator 15 constitute voltage controller 300.

The operation of the high-voltage stabilizing power supply apparatus having the above arrangement will be described.

Assume that a variation occurs in the high voltage output due to the variation in current flowing in load LO. This variation in high-voltage output is detected as an error signal when the terminal voltage of second resistor R2 of resistor voltage divider 200 is compared with reference voltage $V_{REF}$ by error amplifier 14. PWM control signal generator 15 generates a PWM control signal having a pulse width corresponding to the amplitude of the error signal. In accordance with the PWM control signal, FET 12 switches the DC input voltage supplied to the primary winding of step-up transformer 11. This changes the switching frequency (converter frequency) in a range of, e.g., 10 to 100 kHz. As a result, the output from the secondary winding of transformer 11 and hence the high-voltage output obtained through rectifier-smoothing circuit 13 is stabilized to cancel the variation occurring because of the load variation.

Since the above high-voltage stabilizing power supply apparatus has the double shielding (in particular, outer shield 202 connected to cold-side terminal GND) provided to its resistor voltage divider 200, it can compensate for the induction of the switching frequency (converter frequency) component or external inductive noise in resistor voltage divider 200. Furthermore, this apparatus has good frequency response characteristics free from degradation, unlike in a conventional apparatus.

The good frequency response characteristics of the high-voltage stabilizing power supply apparatus of the present invention will be described.

FIG. 2 shows an equivalent circuit diagram including first and second stray capacitors C1 and C2, generated between first and second resistors R1 and R2 and inner and outer shields 201 and 202, of resistor voltage divider 200. In this case, inner shield 201 is electrically connected to the node of first and second resistors R1 and R2, and outer shield 202 is electrically connected to cold-side output terminal GND. Therefore, first and second stray capacitors C1 and C2 are connected to correspond to and be in parallel with resistors R1 and R2.

Note that stray capacitor C1 is generated between first resistor R1 and inner shield 201, and stray capacitor C2 is generated between inner and outer shields 201 and 202. The influence of the capacitance generated between first resistor R2 and inner shield 201 is substantially negligible since the resistances of first and second resistors R1 and R2 satisfy R1 >> R2. Assume that inner and outer shields 201 and 202 are provided to substantially satisfy a relation R1·C1 = R2·C2 in such an equivalent circuit.

In such an equivalent circuit, the transient characteristics of hot-side output terminal $V_{OUT}$ at which a high-voltage variation occurs depending on the load variation and those of the node (indicated by P in FIG. 2) of first and second resistors R1 and R2 coincide. Even when a rectangular wave variation occurs in the high-voltage output, as shown in FIG. 3A, a rectangular wave variation output as indicated by a solid line in FIG. 3B, which is free from rounding at its leading and trailing edges, appears at variation detection point P. The good frequency characteristics of the apparatus of the present invention will be understood from this.

The broken line in FIG. 3B shows a response having a waveform rounding occurring in a conventional apparatus in which only a single shield is provided. This waveform rounding occurs since the conventional apparatus does not have a component corresponding to stray capacitor C1 of the equivalent circuit shown in FIG. 2.

Figure 5A:
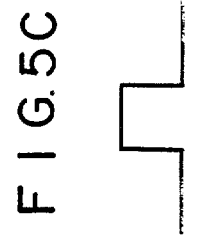
FIGS. 5A to 5C are waveform charts for explaining the operation of the same.
Figure 5B:
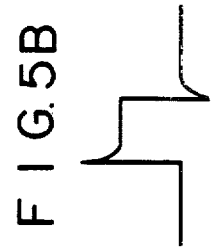
Figure 5C:
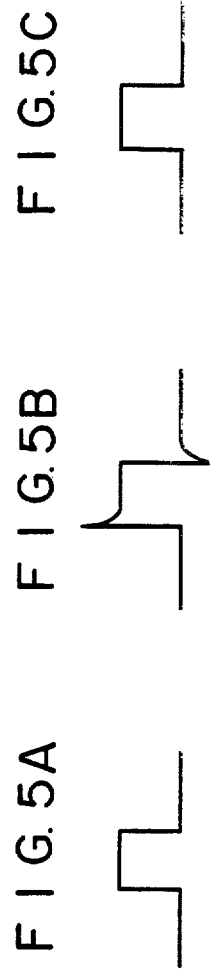

FIG. 4 shows another embodiment of the present invention. The same reference numerals and symbols in FIG. 4 denote the same portions as in FIG. 1. This embodiment is proposed to deal with a case wherein a relation R1·C1 = R2·C2 is not sufficiently satisfied in the equivalent circuit shown in FIG. 2. More specifically, FIG. 4 is different from FIG. 1 only in that phase compensator 400 is provided. Phase compensator 400 is constituted by connecting third resistor R3 and capacitor C3, both of which are of a low withstand voltage type, to both ends of second resistor R2. Phase compensator 400 compensates for unpreferable response characteristics that can occur when the relation $R1 \cdot C1 = R2 \cdot C2$ is not sufficiently satisfied. When a rectangular wave high-voltage output variation, as shown in FIG. 5A, occurs at hot-side output terminal VOUT, a waveform having a transient (a so-called "overshoot" characteristic), wherein sharp spike peaks, as shown in FIG. 5B, occur at its leading and trailing edges, appears at variation detecting point P. This is the unpreferable response characteristic.

Phase compensator 400 of this embodiment bypasses only the overshoot component as described above. As a result, a rectangular wave variation output, whose overshoot component as described above is substantially clipped (deleted), appears at variation detecting point P.

FIGS. 6A to 6D show practical examples of manufacturing a resistor voltage divider device used in the respective embodiments described above.

Figure 6A:
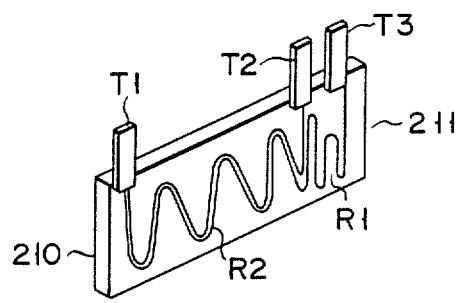
FIGS. 6A to 6D show steps of manufacturing a practical example of a resistor voltage divider device which uses double shields used in the present invention.
Figure 6B:
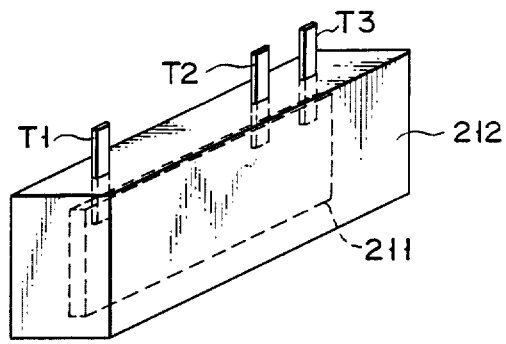
Figure 6C:
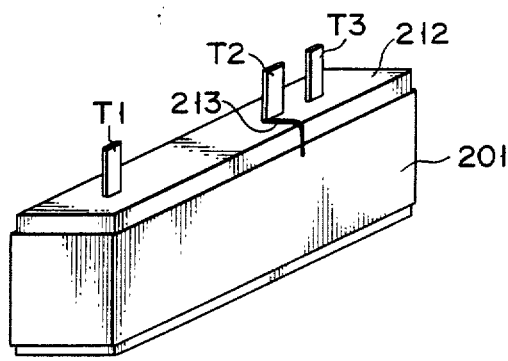
Figure 6D:
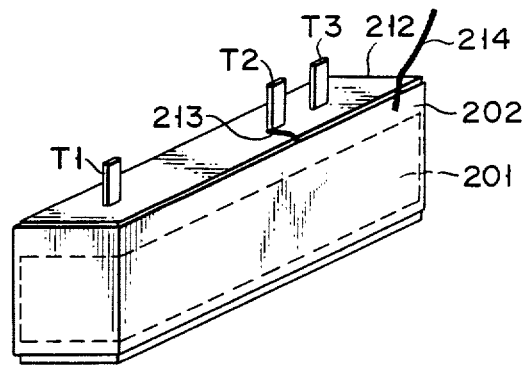

FIG. 6A shows resistor voltage divider main body 211 wherein first and second resistors R1 and R2 are formed by a hybrid (thick film) technique on insulating substrate 210 made of, e.g., ceramic, and lead terminals T1, T2, and T3 are bonded to substrate 210. Resistor voltage divider main body 211 is housed in insulator 212 made of, e.g., epoxy resin, so that terminals T1, T2, and T3 extend to the outside, as shown in FIG. 6B. As shown in FIG. 6C, inner shield 201 of a metal plate or a conductive coating is provided around insulator 212. In this case, shield 201 is electrically connected to terminal T2, bonded to the node of first and second resistors R1 and R2, through lead wire 213. Outer shield 202 of a metal plate or a conductive coating is provided around inner shield 201, as shown in FIG. 6D. In this case, shield 202 is electrically connected to lead wire 214 for connecting it to cold-side terminal GND.

As described above, according to the present invention, there is provided an inexpensive, high-reliability high-voltage stabilizing power supply apparatus which can compensate for inductive noise without using a high withstand voltage capacitor and degrading the frequency response characteristics and which has a high-voltage stability against a load variation.

The present invention is not limited to the embodiments described above in conjunction with the accompanying drawings. Various changes and modifications can be made within the spirit and scope of the invention.

For example, in phase compensator 400 described above, a plurality of resistors and capacitors can be used in combination as resistor R3 and capacitor C3. In some cases, resistor R3 may be omitted. Outer shield 202 need not always be connected to the ground terminal but to the low-voltage-side stabilizing potential point. This is suitable when a high-voltage output is to be obtained by connecting a plurality of, e.g., apparatuses of the present invention in a stacked manner.

What is claimed is:

1. A high-voltage stabilizing power supply apparatus comprising:
    input means for receiving a DC input;
    DC-DC converter means coupled to said input means, and for converting the DC input to a predetermined high-voltage DC output according to a predetermined control signal;
    output means coupled to said DC-DC converter means, having a pair of high- and low-voltage-side output paths, and for supplying the predetermined high-voltage DC output to a load;
    output variation detecting means, having a resistor voltage dividing circuit including high- and low-voltage-side resistors connected in series between said pair of output paths, for detecting a variation in predetermined high-voltage DC output that follows a variation in said load;
    inner shield means, for shielding an exterior of said resistor voltage dividing circuit, said inner shield means being electrically connected to a node of said high- and low-voltage-side resistors;
    outer shield means, for shielding an exterior of said inner shield means, said outer shield means being electrically connected to said low-voltage-side output path of said pair of output paths; and
    control means for receiving a voltage component generated across both ends of said low-voltage-side resistor of said resistor voltage dividing circuit, generating the predetermined control signal in accordance with the voltage component, and supplying the predetermined control signal to said DC-DC converter means.

2. An apparatus according to claim 1, wherein said low voltage-side path of said pair of output paths is grounded.

3. An apparatus according to claim 1, wherein said output variation detecting means includes a phase compensating circuit connected to both ends of said low-voltage-side resistor.

4. An apparatus according to claim 3, wherein said phase compensating circuit has at least one capacitor.

5. An apparatus according to claim 4, wherein said phase compensating circuit has at least one resistor connected in series with said capacitor.

6. An apparatus according to claim 1, wherein said output variation detecting means has a resistor voltage dividing circuit including first and second thick film resistors formed in series with each other on an insulating substrate and at least three lead terminal members bonded to both ends and an intermediate point of a circuit of said first and second thick film resistors.

7. An apparatus according to claim 6, wherein said resistor voltage dividing circuit has a main body housed in an insulator.

8. An apparatus according to claim 7, wherein a first shield is provided to surround said insulator, said first shield being electrically connected to said lead terminal member bonded to the intermediate point of the circuit of said first and second thick film resistors.

9. An apparatus according to claim 8, wherein a second shield is provided to surround said first shield.

* * * * *

UNITED STATES PATENT AND TRADEMARK OFFICE
CERTIFICATE OF CORRECTION

PATENT NO. : 4,725,936

DATED : February 16, 1988

INVENTOR(S) : Akira Nakajima, et al.

It is certified that error appears in the above-identified patent and that said Letters Patent is hereby corrected as shown below:

Title page:

In the designation of priority, "61-38895" should read -- 61-38895(U) --.

Signed and Sealed this

Ninth Day of August, 1988

Attest:

DONALD J. QUIGG

Attesting Officer

Commissioner of Patents and Trademarks